July 19, 1955 W. C. BELK 2,713,434
FRUIT FEEDING MECHANISM FOR PROCESSING MACHINES
Filed Oct. 22, 1953 2 Sheets-Sheet 1
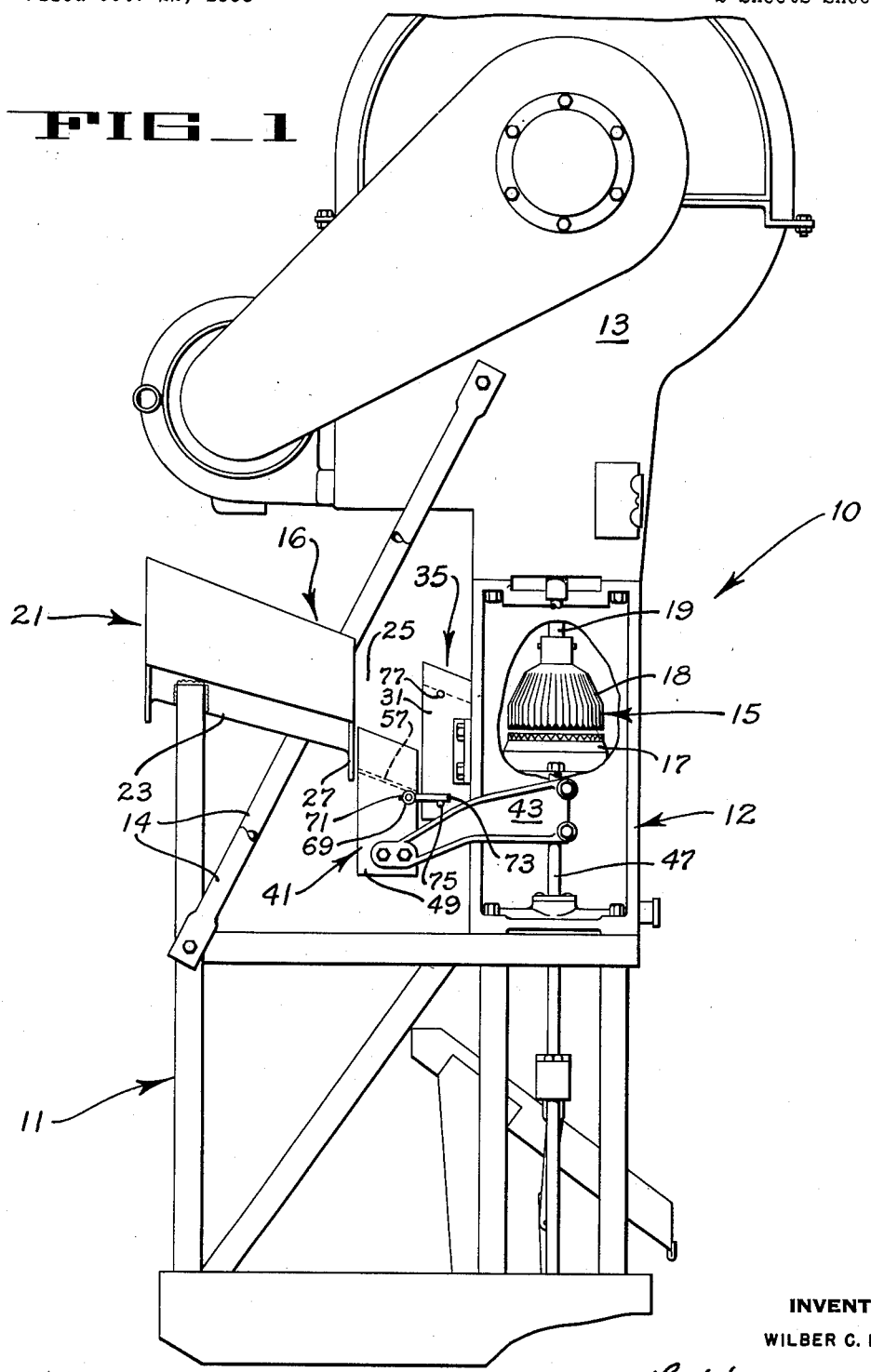
FIG_1
INVENTOR
WILBER C. BELK
BY Hans G. Hoffmeister
ATTORNEY July 19, 1955  W. C. BELK  2,713,434
FRUIT FEEDING MECHANISM FOR PROCESSING MACHINES
Filed Oct. 22, 1953  2 Sheets-Sheet 2

INVENTOR
WILBER C. BELK
BY Hans G. Hoffmeister
ATTORNEY

United States Patent Office 2,713,434
Patented July 19, 1955

2,713,434

FRUIT FEEDING MECHANISM FOR PROCESSING MACHINES

Wilber C. Belk, Lakeland, Fla., assignor to Food Machinery and Chemical Corporation, San Jose, Calif., a corporation of Delaware Application October 22, 1953, Serial No. 387,724

5 Claims. (Cl. 214—711)

This invention pertains to apparatus for feeding fruit in timed relation to a fruit processing machine, and relates more particularly to a shuffle type feeder for a fruit processing machine.

One object of the present invention is to provide a new and improved shuffle type fruit feeder.

Another object is to provide a shuffle type feeder for feeding fruit to a processing machine in timed relation with the operation of the same.

Another object is to provide a shuffle type fruit feeder having a positive fruit ejecting device.

These and other objects and advantages of the present invention will become apparent from the following description and accompanying drawings in which:

Fig. 1 is a side elevation of a citrus fruit juice extracting machine embodying the present invention, certain parts being broken away.

Figure 3:
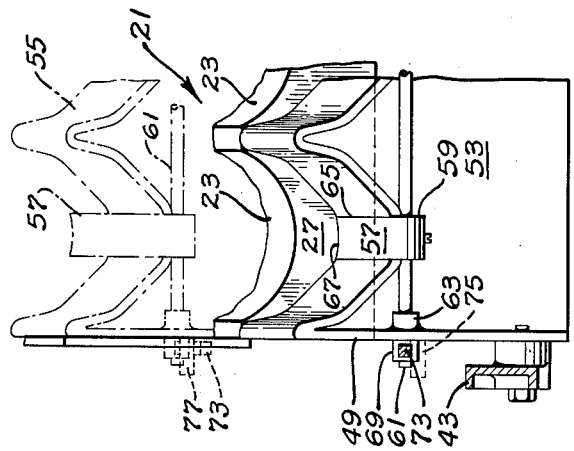
Fig. 3 is a fragmentary section taken along line 3—3 of Fig. 2, certain parts being shown in dotted lines, and a different operational position of the machine being shown in phantom lines.

The fruit feeding mechanism of the present invention is illustrated in connection with a citrus fruit juice extracting machine 10 (Fig. 1) of the type described in U. S. Patent No. 2,649,730 granted to James M. Hait. However, it should be understood that the present invention may be readily adapted for use with a wide variety of other types of fruit processing machines and that it is not restricted solely to use with citrus fruit juice extractors. Only those portions of the entire extracting machine 10 necessary for a complete understanding of the present invention have been shown and for complete details of the construction and operation of the extractor 10, reference should be had to the above mentioned patent.

In general, the fruit juice extracting machine 10 (Fig. 1) comprises a base 11, an intermediate frame 12 rigidly secured to the base 11 and a power head assembly 13 supported by and secured to the intermediate frame 12. Diagonal braces 14 are suitably connected on each side of the machine to the base 11 and the head 13 to rigidify the structure.

The intermediate frame 12 (Fig. 1) has associated therewith a whole fruit squeezing mechanism 15 and a shuffle type fruit feeding assembly 16 for supplying individual whole citrus fruit to the squeezing mechanism 15. The squeezing mechanism 15 comprises several transversely spaced sets of interdigitating, lower and upper cups 17 and 18, respectively, only one such set being shown in the drawings. The lower cup 17 is supported in an upwardly facing, stationary position by the frame 12. The upper cup 18 is vertically aligned with the lower cup 17 and is secured in a downwardly facing position to a rod 19 which is suitably mounted within the power head 13 for vertical reciprocating movement, in a manner fully explained in the above mentioned patent.

The shuffle type fruit feeder 16 comprises a multi-channeled fruit supply chute 21 (Figs. 2 and 3) rigidly supported forwardly of the squeezing mechanism 15 by the base 11. The chute 21 has as many channels or runways 23 (Figs. 2 and 3), only one of which is completely shown, as there are sets of cups 17 and 18, and each runway 23 is longitudinally aligned with a set of the cups 17 and 18. The runways 23 slope rearwardly and downwardly and they terminate at an open space 25 (Fig. 1) that is bounded by a front vertical wall 27 (Fig. 2) depending from the rear edge of the runways 23 and by a rear vertical wall 29. The wall 29 is supported between side walls 31 and 33 of a multi-channeled fruit discharge chute 35 rigidly secured to the intermediate frame 12. The discharge chute 35 is provided with a plurality of short, elevated channels or runways 37, only one of which is shown, which slope rearwardly and downwardly from the upper edge of the wall 29 to a point adjacent the lower cups 17. There are as many runways 37 as there are sets of cups 17 and 18, and each runway 37 is longitudinally aligned with a set of cups 17 and 18.

Positioned in the space 25 between the supply chute 21 and the discharge chute 35 is a fruit elevator 41 supported by two laterally spaced brackets 43 (Fig. 1) and 45 (Fig. 2), each of which is clamped on one of two vertical shafts 47 (Fig. 1), only one of which is shown, positioned at opposite sides of the extractor 10. The shafts 47 extend upwardly into the power head 13 where they are suitably mounted (by means not shown) for vertical reciprocation in timed relation with the upper cup supporting rod 19. The elevator 41 comprises two side walls 49 and 51 (Fig. 2) connected by a forward wall 53 to the upper edge of which is fastened a plurality of rearwardly and downwardly sloping runways 55 (Fig. 3), there being as many runways as there are sets of cups 17 and 18, and said runways being disposed in longitudinal alignment with the runways 23 and 37 of the fruit supply and discharge chutes. Reciprocation of the shafts 47 moves the elevator 41 between a lowered position, shown in full lines in Figs. 2 and 3, wherein the elevator runways 55 are disposed slightly below the supply runways 23, and a raised position, indicated by phantom lines in Figs. 2 and 3, wherein the elevator runways 55 are in alignment with the runways 37 of the discharge chute 35.

Figure 2:
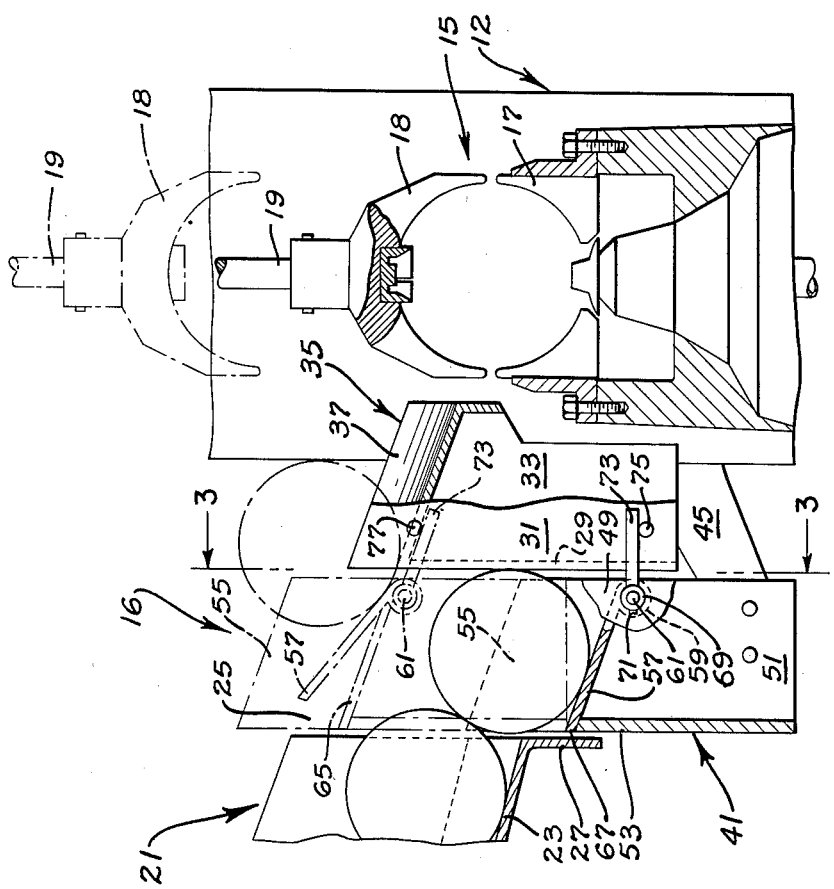
Fig. 2 is a longitudinal section of a portion of the machine shown in Fig. 1, certain parts being shown in elevation, and a different operational position of the machine being shown in phantom lines.

Each of the elevator runways 55 (Figs. 2 and 3) is provided with an arm 57 for positively ejecting fruit therefrom when the elevator reaches its raised position. The arms 57 have hubs 59 formed integral therewith at one of their ends. These hubs are adjustably secured in spaced relationship on a transversely extending shaft 61 journaled in bosses 63 (Fig. 3), only one of which is shown, provided on the elevator side walls 49 and 51. The arms 57 are adapted to fit in longitudinal slots 65 cut in the center of each runway 55 and to be normally supported therein with their upper surface flush with the upper surface of the runways 55 by contact of their free end 67 (Fig. 2) with the upper edge of the elevator wall 53. The shaft 61 (Fig. 3) extends outwardly beyond the elevator side walls 49 and 51 and is held against lateral movement by two collars 69, only one of which is shown, secured on either end of the shaft 61 by set-screws 71 (Fig. 2). The collar 69 adjacent the side wall 49 has a lever 73 extending radially and rearwardly therefrom, said lever being arranged to alternately contact, upon reciprocation of the elevator 41, two vertically aligned pins 75 and 77 secured to the side wall 31 of the discharge chute 35.

In operation with the elevator 41 and the upper cup 18 continuously reciprocating up and down in timed relation, fruit to be processed by the mechanism 15 is fed from a source of supply indiscriminately to the chute 21 where it is arranged into a number of parallel longitudinal lines by the supply chute runways 23. When the elevator 41 is raised slightly above its lowered position, the elevator wall 53 (Fig. 2) prevents the fruit in the runways 23 from rolling off the sloped runways and into the space 25. However, when the elevator descends to its lowered position the wall 53 and the elevator runways 55 move below the supply runways 23, thus allowing a fruit from each runway 23 to roll downwardly onto a corresponding one of the elevator runways 55, as shown in Fig. 2. The fruit thus fed to the elevator runways 55 is prevented from rolling therefrom by the wall 29 of the discharge chute 35, and the length of the runways 55 is such that only one fruit at a time may be received thereby.

After a short period of dwell at its lowered position the elevator 41 rises carrying with it the fruit it received from the runways 23. When the elevator 41 nears its raised position the lever 73 (Fig. 2) strikes the stationary pin 77 and further upward movement of the elevator depresses the lever 73 and rotates the shaft 61 and the arms 57 in a clockwise direction, as seen in Fig. 2. This depression of the lever 73 continues until the elevator 41 reaches its raised position, when the lever 73 and the arms 57 are positioned as shown in phantom lines in Figs. 2 and 3. The above described movement of the arms 57 ejects the fruit rearwardly from the inclined elevator runways 55 down onto the sloped discharge chute runways 37, whence it moves into the open lower cups 17, the upper cup 18 being at this time in a raised position, as shown in phantom lines in Figs. 2 and 3. In this way irregular fruit, for example tangerines, which frequently have quite flat apexes and hence may not roll off the sloped runways 55 if they are resting on said apexes, can be positively transferred to the discharge chute 35 from which they will gravitate to the lower cups 17. Without the positive transfer provided by the ejecting arms 57 irregular fruit will often ride up and down the elevator 41 without rolling onto the discharge chute 35 when the elevator reaches its raised position, or it will be so slow in rolling from the elevator 41 that it is not completely in the cup 17 when the cup 18 descends to interdigitate with the cup 17, thereby resulting in mashing of the fruit. Furthermore, such mashed fruit may obstruct the path of the subsequently fed, properly timed fruit to such a degree that it will not arrive at the cup 17 in time and will also be mashed.

After the fruit on the elevator 41 has been fed to the lower cups 17, the upper cups 18 descend to squeeze the fruit and begin the actual juice extraction process. Simultaneously, the elevator 41 descends, moving the lever 73 out of contact with the pin 77. The weight of the arms 57 is sufficient to overbalance the weight of the lever 73 and hence the arms 57 usually drop back into the slots 65 in the runways 55 after the lever 73 leaves contact with the pin 77. Occasionally, however, due to sticking of the shaft 61 in the bosses 63, or to various other reasons, the arms 57 may fail to drop back into their slots 65, and the elevator will approach its lowered, fruit receiving position with the arms 57 still in fruit ejecting position. In this event the depressed lever 73 will strike the pin 75 upon the approach of the elevator to its lowered position, thus rotating the raised arms 57 in a counterclockwise direction, as viewed in Fig. 2, positively returning them to their slots 65. Consequently, when the elevator 41 reaches its lowered position its runways 55 will always be prepared to again receive fruit from the supply chute 21 and to repeat the fruit feeding operation.

While I have described a preferred embodiment of the present invention, it will be understood that various changes and modifications may be made in the details thereof without departing from the spirit and scope of the appended claims.

Having thus described the invention what I claim as new and desire to protect by Letters Patent is:

1. In a shuffle type fruit feeder having a fruit supply chute, a raised fruit discharge chute, a fruit elevator having a fruit supporting floor rigid with respect to said elevator, and means for reciprocating the elevator between the fruit supply chute and the fruit discharge chute, the combination of, means forming part of the elevator floor for contacting and ejecting fruit from the elevator, and means operative to actuate said fruit contacting and ejecting means substantially upon the arrival of the elevator at the fruit discharge chute.

2. A fruit feeding mechanism comprising a fruit elevator, means for moving the elevator between a fruit receiving station and a fruit discharge station, means for supplying fruit to the elevator at the fruit receiving station, fruit ejecting means on said elevator movable to operative and inoperative positions, means for moving said fruit ejecting means from its inoperative to its operative position to eject fruit from the elevator at the fruit discharging station, and means for returning said fruit ejecting means to its inoperative position at the fruit receiving station.

3. A fruit feeding mechanism comprising a fruit elevator, means for moving the elevator between fruit receiving and fruit discharging stations, means for supplying fruit to the elevator at the fruit receiving station, means on the elevator movable to operative and inoperative positions for ejecting fruit from said elevator, an actuating lever operatively associated with the fruit ejecting means, and means cooperating with said actuating lever and independent of the elevator for positively moving the ejecting means from its inoperative to its operative position during movement of the elevator toward the fruit discharging station and to its inoperative position during movement of the elevator toward its fruit receiving station.

4. A fruit feeding mechanism comprising a fruit elevator, means for moving the elevator between fruit receiving and fruit discharging stations, means for supplying fruit to the elevator at the fruit receiving station, a fruit ejecting arm pivotally mounted on the fruit elevator, a lever operatively associated with the arm, first abutment means arranged to contact said lever upon the approach of the elevator to the discharge station to pivot the lever and the arm in predetermined directions and eject fruit from the elevator, and second abutment means arranged to contact said lever upon the approach of the elevator to the fruit receiving station for pivoting the fruit ejecting arm opposite from said predetermined direction.

5. A fruit feeding mechanism comprising a fruit elevator provided with a fruit supporting runway having an opening therein, means for moving the elevator between fruit receiving and fruit discharging stations, means for supplying fruit to the elevator runway at the fruit receiving station, a fruit ejecting arm pivotally mounted on the elevator and arranged to normally lie in the elevator runway opening, means for pivoting said arm upwardly out of said opening to eject fruit from the elevator runway, and means for positively returning said arm to the runway opening prior to the supplying of fruit to the elevator at the fruit receiving station.

References Cited in the file of this patent

UNITED STATES PATENTS

| 963,478 | Shelly | July 5, 1910 |
| 1,452,608 | Kirst | Apr. 24, 1923 |
| 1,949,964 | Keller et al. | Mar. 6, 1934 |
| 2,649,730 | Hait | Aug. 25, 1953 |
| 2,667,118 | Nelson | Jan. 26, 1954 |

FOREIGN PATENTS

| 349,298 | Great Britain | May 28, 1931 |